United States Patent [19]
Ng

[11] Patent Number: 5,502,793
[45] Date of Patent: *Mar. 26, 1996

[54] RESOLUTION ENHANCEMENT SYSTEM FOR BINARY IMAGES

[75] Inventor: Yee S. Ng, Fairport, N.Y.

[73] Assignee: Eastman Kodak Company, Rochester, N.Y.

[ * ] Notice: The term of this patent shall not extend beyond the expiration date of Pat. No. 5,450,531.

[21] Appl. No.: 983,155

[22] Filed: Nov. 30, 1992

[51] Int. Cl.$^6$ .............................. G06K 15/00; H04N 1/40
[52] U.S. Cl. .......................... 395/109; 395/115; 395/128
[58] Field of Search .................................. 395/109, 110, 395/112, 128, 150, 114–116

[56] References Cited

U.S. PATENT DOCUMENTS

| | | | |
|---|---|---|---|
| 4,707,647 | 11/1987 | Coldren et al. | 395/94 |
| 4,751,585 | 6/1988 | Shibazaki | 358/464 |
| 4,780,711 | 10/1988 | Doumas . | |
| 4,817,179 | 3/1989 | Buck | 382/34 |
| 4,847,641 | 7/1989 | Tung | 395/109 |
| 4,908,872 | 3/1990 | Tonu et al. | 382/22 |
| 5,005,139 | 4/1991 | Tung | 364/519 |
| 5,029,108 | 7/1991 | Lung | 364/519 |
| 5,327,260 | 7/1994 | Shimomae et al. | 358/448 |
| 5,343,309 | 8/1994 | Roetling | 358/455 |
| 5,396,584 | 3/1995 | Lee et al. | 395/132 |

FOREIGN PATENT DOCUMENTS

| | | |
|---|---|---|
| 2015518 | of 1990 | Canada . |
| 0199502 | 10/1986 | European Pat. Off. . |
| 0234590 | 9/1987 | European Pat. Off. . |

OTHER PUBLICATIONS

IBM Technical Disclos. Bulletin: vol. 28, No. 12, May 1986 pp. 5634–5637 'Fast One Pixel Edge Detctor' (see whole document).
MacUser, "Image Makers", Henry Bortman, Nov. 1991, pp. 98, 102, 103.

*Primary Examiner*—Raymond J. Bayerl
*Assistant Examiner*—Tracy M. Legree
*Attorney, Agent, or Firm*—Norman Rushefsky

[57] ABSTRACT

An image processing system for providing edge enhancement of low resolution binary image files processes the low resolution bitmap data in sections or windows to determine whether an edge transition or "kink site" occurs within each window. The original bitmap data in the window is then replaced with edge enhanced gray scale data if a kink site is identified. The selection of the correct edge enhanced gray scale data to be used in place of the original bitmap data is based on whether the central pixel contained within the window is a black or white pixel, whether the central pixel is located on a single pixel line, and the location of the central pixel with respect to the kink site. The determination of whether the central pixel is a black or white pixel is based on the binary value assigned to the pixel, the determination of the location of the central pixel with respect to the kink site is based on pixel values and gradient magnitudes of surrounding pixel locations, and the determination of whether the central pixel is located on a single pixel line is based on the gradient magnitude of the central pixel and surrounding pixel locations.

30 Claims, 28 Drawing Sheets

|    |    |    |    |    |    |    |    |    |
|----|----|----|----|----|----|----|----|----|
| 2A | 2B |
| 2C | 2D |

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 255 | 255 | 255 | 255 | 255 | 255 | 255 | 255 | 255 |
| 255 | 255 | 255 | 255 | 255 | 255 | 255 | 255 | 255 |
| 255 | 255 | 255 | 0 | 0 | 0 | 0 | 0 | 255 |
| 255 | 255 | 0 | 0 | 0 | 0 | 0 | 0 | 0 |
| 255 | 255 | 0 | 0 | 0 | 0 | 0 | 0 | 0 |
| 255 | 0 | 0 | 0 | 0 | 0 | 0 | 0 | 0 |
| 255 | 0 | 0 | 0 | 0 | 0 | 0 | 0 | 0 |
| 255 | 0 | 0 | 0 | 0 | 0 | 0 | 0 | 0 |
| 255 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 255 |
| 0 | 0 | 0 | 0 | 0 | 255 | 255 | 255 | 255 |
| 255 | 255 | 255 | 255 | 255 | 255 | 255 | 255 | 255 |
| 255 | 255 | 255 | 255 | 255 | 255 | 255 | 255 | 0 |
| 0 | 0 | 0 | 255 | 255 | 255 | 255 | 255 | 0 |

FIG. 2A

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 255 | 255 | 0 | 0 | 0 | 0 | 0 | 0 | 0 | 0 |
| 255 | 255 | 255 | 255 | 0 | 0 | 0 | 0 | 0 | 0 |
| 255 | 255 | 255 | 255 | 255 | 0 | 0 | 0 | 0 | 0 |
| 0 | 255 | 255 | 255 | 255 | 255 | 0 | 0 | 0 | 0 |
| 0 | 255 | 255 | 255 | 255 | 255 | 0 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 255 | 255 | 255 | 255 | 255 | 0 | 0 | 0 | 0 |
| 0 | 255 | 255 | 255 | 255 | 255 | 0 | 0 | 0 | 0 |
| 255 | 255 | 255 | 255 | 255 | 0 | 0 | 0 | 0 | 0 |
| 255 | 255 | 255 | 255 | 0 | 0 | 0 | 0 | 0 | 0 |
| 255 | 255 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 2B

| 0 | 0 | 0 | 255 | 255 | 255 | 255 | 255 | 0 |
|---|---|---|---|---|---|---|---|---|
| 0 | 0 | 0 | 255 | 255 | 255 | 255 | 255 | 255 |
| 0 | 0 | 0 | 0 | 255 | 255 | 255 | 255 | 255 |
| 0 | 0 | 0 | 0 | 255 | 255 | 255 | 255 | 255 |
| 0 | 0 | 0 | 0 | 255 | 255 | 255 | 255 | 255 |
| 0 | 0 | 0 | 0 | 0 | 255 | 255 | 255 | 255 |
| 0 | 0 | 0 | 0 | 0 | 255 | 255 | 255 | 255 |
| 0 | 0 | 0 | 0 | 0 | 0 | 255 | 255 | 255 |
| 0 | 0 | 0 | 0 | 0 | 0 | 255 | 255 | 255 |
| 0 | 0 | 0 | 0 | 0 | 0 | 255 | 255 | 255 |
| 0 | 0 | 0 | 0 | 0 | 0 | 0 | 255 | 255 |
| 0 | 0 | 0 | 0 | 0 | 0 | 0 | 255 | 255 |
| 0 | 0 | 0 | 0 | 0 | 0 | 0 | 255 | 255 |
| 0 | 0 | 0 | 0 | 0 | 0 | 0 | 0 | 255 |
| 0 | 0 | 0 | 0 | 0 | 0 | 0 | 0 | 255 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 2C

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 255 | 0 | 0 | 0 | 0 | 0 | 0 | 0 | 0 | 0 |
| 255 | 0 | 0 | 0 | 0 | 0 | 0 | 0 | 0 | 0 |
| 255 | 0 | 0 | 0 | 0 | 0 | 0 | 0 | 0 | 0 |
| 255 | 255 | 0 | 0 | 0 | 0 | 0 | 0 | 0 | 0 |
| 255 | 255 | 0 | 0 | 0 | 0 | 0 | 0 | 0 | 0 |
| 255 | 255 | 255 | 0 | 0 | 0 | 0 | 0 | 0 | 0 |
| 255 | 255 | 255 | 0 | 0 | 0 | 0 | 0 | 0 | 0 |
| 255 | 255 | 255 | 0 | 0 | 0 | 0 | 0 | 0 | 0 |
| 255 | 255 | 255 | 255 | 0 | 0 | 0 | 0 | 0 | 0 |
| 255 | 255 | 255 | 255 | 255 | 0 | 0 | 0 | 0 | 0 |
| 255 | 255 | 255 | 255 | 255 | 255 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 2D

|   |   |
|---|---|
| 3A | 3B |
| 3C | 3D |

| | | | | | | | | |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 806 | 1020 | 1020 | 1020 | 1020 | 1020 | 1020 | 1020 | 1020 |
| 1062 | 1020 | 1020 | 1020 | 1020 | 1020 | 1020 | 1020 | 1020 |
| 1020 | 0 | 361 | 806 | 1020 | 1020 | 1020 | 806 | 361 |
| 1020 | 361 | 1062 | 1140 | 1020 | 1020 | 1020 | 1140 | 1140 |
| 1020 | 806 | 1140 | 361 | 0 | 0 | 0 | 361 | 806 |
| 806 | 1140 | 806 | 0 | 0 | 0 | 0 | 0 | 0 |
| 361 | 1140 | 361 | 0 | 0 | 0 | 0 | 0 | 0 |
| 0 | 1020 | 0 | 0 | 0 | 0 | 0 | 0 | 0 |
| 0 | 1020 | 0 | 0 | 0 | 0 | 0 | 0 | 0 |
| 510 | 806 | 0 | 0 | 0 | 0 | 0 | 0 | 0 |
| 510 | 361 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 361 |
| 0 | 0 | 0 | 0 | 0 | 0 | 0 | 361 | 1062 |
| 0 | 0 | 0 | 0 | 361 | 806 | 1020 | 1140 | 1062 |
| 806 | 1020 | 1020 | 1020 | 1140 | 1140 | 1020 | 806 | 0 |
| 1062 | 1020 | 1020 | 1020 | 806 | 361 | 0 | 361 | 1062 |
| 1062 | 1020 | 806 | 361 | 0 | 0 | 0 | 806 | 1140 |
| 806 | 1020 | 1062 | 806 | 0 | 0 | 0 | 1020 | 1020 |

FIG. 3A

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 1020 | 806 | 361 | 0 | 0 | 0 | 0 | 0 | 0 | 0 |
| 1020 | 1140 | 1140 | 806 | 361 | 0 | 0 | 0 | 0 | 0 |
| 0 | 361 | 806 | 1140 | 1062 | 361 | 0 | 0 | 0 | 0 |
| 806 | 361 | 0 | 361 | 1062 | 1062 | 361 | 0 | 0 | 0 |
| 1020 | 806 | 0 | 0 | 361 | 1140 | 806 | 0 | 0 | 0 |
| 806 | 1140 | 361 | 0 | 0 | 806 | 1140 | 361 | 0 | 0 |
| 361 | 1140 | 806 | 0 | 0 | 361 | 1140 | 806 | 0 | 0 |
| 0 | 1020 | 1020 | 0 | 0 | 0 | 1020 | 1020 | 0 | 0 |
| 0 | 1020 | 1020 | 0 | 0 | 0 | 1020 | 1020 | 0 | 0 |
| 0 | 1020 | 1020 | 0 | 0 | 0 | 1020 | 1020 | 0 | 0 |
| 361 | 1140 | 806 | 0 | 0 | 361 | 1140 | 806 | 0 | 0 |
| 806 | 1140 | 361 | 0 | 0 | 806 | 1140 | 361 | 0 | 0 |
| 1140 | 806 | 0 | 0 | 361 | 1140 | 806 | 0 | 0 | 0 |
| 1062 | 361 | 0 | 361 | 1062 | 1062 | 361 | 0 | 0 | 0 |
| 361 | 361 | 806 | 1140 | 1062 | 361 | 0 | 0 | 0 | 0 |
| 806 | 1140 | 1140 | 806 | 361 | 0 | 0 | 0 | 0 | 0 |
| 1140 | 806 | 361 | 0 | 0 | 0 | 0 | 0 | 0 | 0 |
| 361 | 0 | 0 | 0 | 0 | 0 | 0 | 0 | 0 | 0 |
| 0 | 0 | 0 | 0 | 0 | 0 | 0 | 0 | 0 | 0 |

FIG. 3B

| 0 | 0 | 1020 | 1020 | 0 | 0 | 0 | 806 | 1140 |
|---|---|---|---|---|---|---|---|---|
| 0 | 0 | 806 | 1140 | 361 | 0 | 0 | 361 | 1140 |
| 0 | 0 | 361 | 1140 | 806 | 0 | 0 | 0 | 1020 |
| 0 | 0 | 0 | 1020 | 1020 | 0 | 0 | 0 | 806 |
| 0 | 0 | 0 | 806 | 1140 | 361 | 0 | 0 | 361 |
| 0 | 0 | 0 | 361 | 1140 | 806 | 0 | 0 | 0 |
| 0 | 0 | 0 | 0 | 806 | 1140 | 361 | 0 | 0 |
| 0 | 0 | 0 | 0 | 361 | 1140 | 806 | 0 | 0 |
| 0 | 0 | 0 | 0 | 0 | 1020 | 1020 | 0 | 0 |
| 0 | 0 | 0 | 0 | 0 | 806 | 1140 | 361 | 0 |
| 0 | 0 | 0 | 0 | 0 | 361 | 1140 | 806 | 0 |
| 0 | 0 | 0 | 0 | 0 | 0 | 1020 | 1020 | 0 |
| 0 | 0 | 0 | 0 | 0 | 0 | 806 | 1140 | 361 |
| 0 | 0 | 0 | 0 | 0 | 0 | 361 | 1140 | 806 |
| 0 | 0 | 0 | 0 | 0 | 0 | 0 | 806 | 1020 |
| 0 | 0 | 0 | 0 | 0 | 0 | 0 | 361 | 806 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 3C

| 361 | 0 | 0 | 0 | 0 | 0 | 0 | 0 | 0 | 0 |
|---|---|---|---|---|---|---|---|---|---|
| 806 | 0 | 0 | 0 | 0 | 0 | 0 | 0 | 0 | 0 |
| 1020 | 0 | 0 | 0 | 0 | 0 | 0 | 0 | 0 | 0 |
| 1140 | 361 | 0 | 0 | 0 | 0 | 0 | 0 | 0 | 0 |
| 1140 | 806 | 0 | 0 | 0 | 0 | 0 | 0 | 0 | 0 |
| 1020 | 1020 | 0 | 0 | 0 | 0 | 0 | 0 | 0 | 0 |
| 806 | 1140 | 361 | 0 | 0 | 0 | 0 | 0 | 0 | 0 |
| 361 | 1140 | 806 | 0 | 0 | 0 | 0 | 0 | 0 | 0 |
| 0 | 806 | 1140 | 361 | 0 | 0 | 0 | 0 | 0 | 0 |
| 0 | 361 | 1140 | 806 | 0 | 0 | 0 | 0 | 0 | 0 |
| 0 | 0 | 1020 | 1020 | 0 | 0 | 0 | 0 | 0 | 0 |
| 0 | 0 | 806 | 1140 | 361 | 0 | 0 | 0 | 0 | 0 |
| 0 | 0 | 361 | 1062 | 1062 | 361 | 0 | 0 | 0 | 0 |
| 0 | 0 | 0 | 361 | 1062 | 1062 | 361 | 0 | 0 | 0 |
| 1020 | 1020 | 1020 | 1020 | 806 | 806 | 510 | 0 | 0 | 0 |
| 1020 | 1020 | 1020 | 1020 | 1020 | 806 | 361 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 3D

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 252 | 270 | 270 | 270 | 270 | 270 | 270 | 270 | 270 |
| 225 | 270 | 270 | 270 | 270 | 270 | 270 | 270 | 270 |
| 180 | 0 | 45 | 72 | 90 | 90 | 90 | 106 | 135 |
| 180 | 45 | 45 | 63 | 90 | 90 | 90 | 117 | 117 |
| 180 | 18 | 27 | 45 | 0 | 0 | 0 | 135 | 106 |
| 162 | 27 | 18 | 0 | 0 | 0 | 0 | 0 | 0 |
| 135 | 27 | 45 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 90 | 18 | 0 | 0 | 0 | 0 | 0 | 0 | 0 |
| 90 | 45 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 225 |
| 0 | 0 | 0 | 0 | 0 | 0 | 0 | 225 | 225 |
| 0 | 0 | 0 | 0 | 225 | 252 | 270 | 243 | 225 |
| 252 | 270 | 270 | 270 | 243 | 243 | 270 | 252 | 0 |
| 225 | 270 | 270 | 270 | 252 | 225 | 0 | 45 | 45 |
| 135 | 90 | 106 | 135 | 0 | 0 | 0 | 18 | 27 |
| 106 | 90 | 135 | 162 | 0 | 0 | 0 | 0 | 0 |

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 270 | 265 | 315 | 0 | 0 | 0 | 0 | 0 | 0 | 0 |
| 270 | 297 | 297 | 268 | 315 | 0 | 0 | 0 | 0 | 0 |
| 0 | 316 | 266 | 297 | 315 | 315 | 0 | 0 | 0 | 0 |
| 106 | 135 | 0 | 315 | 315 | 315 | 315 | 0 | 0 | 0 |
| 136 | 162 | 0 | 0 | 315 | 333 | 342 | 0 | 0 | 0 |
| 162 | 153 | 135 | 0 | 0 | 342 | 333 | 315 | 0 | 0 |
| 135 | 153 | 162 | 0 | 0 | 315 | 333 | 342 | 0 | 0 |
| 0 | 180 | 180 | 0 | 0 | 0 | 0 | 0 | 0 | 0 |
| 0 | 180 | 180 | 0 | 0 | 0 | 0 | 0 | 0 | 0 |
| 0 | 180 | 180 | 0 | 0 | 0 | 0 | 0 | 0 | 0 |
| 225 | 207 | 196 | 0 | 0 | 45 | 27 | 16 | 0 | 0 |
| 196 | 207 | 225 | 0 | 0 | 16 | 27 | 45 | 0 | 0 |
| 207 | 196 | 0 | 0 | 45 | 27 | 16 | 0 | 0 | 0 |
| 225 | 225 | 0 | 45 | 45 | 45 | 45 | 0 | 0 | 0 |
| 225 | 45 | 72 | 63 | 45 | 45 | 0 | 0 | 0 | 0 |
| 72 | 63 | 63 | 72 | 45 | 0 | 0 | 0 | 0 | 0 |
| 63 | 72 | 45 | 0 | 0 | 0 | 0 | 0 | 0 | 0 |
| 45 | 0 | 0 | 0 | 0 | 0 | 0 | 0 | 0 | 0 |
| 0 | 0 | 0 | 0 | 0 | 0 | 0 | 0 | 0 | 0 |

FIG. 4B

| | | | | | | | | |
|---|---|---|---|---|---|---|---|---|
| 0 | 0 | 180 | 180 | 0 | 0 | 0 | 342 | 333 |
| 0 | 0 | 162 | 153 | 135 | 0 | 0 | 315 | 333 |
| 0 | 0 | 135 | 153 | 162 | 0 | 0 | 0 | 0 |
| 0 | 0 | 0 | 180 | 180 | 0 | 0 | 0 | 342 |
| 0 | 0 | 0 | 162 | 153 | 135 | 0 | 0 | 315 |
| 0 | 0 | 0 | 135 | 153 | 162 | 0 | 0 | 0 |
| 0 | 0 | 0 | 0 | 162 | 153 | 135 | 0 | 0 |
| 0 | 0 | 0 | 0 | 135 | 153 | 162 | 0 | 0 |
| 0 | 0 | 0 | 0 | 0 | 180 | 180 | 0 | 0 |
| 0 | 0 | 0 | 0 | 0 | 162 | 153 | 135 | 0 |
| 0 | 0 | 0 | 0 | 0 | 135 | 153 | 162 | 0 |
| 0 | 0 | 0 | 0 | 0 | 0 | 180 | 180 | 0 |
| 0 | 0 | 0 | 0 | 0 | 0 | 162 | 153 | 135 |
| 0 | 0 | 0 | 0 | 0 | 0 | 135 | 153 | 162 |
| 0 | 0 | 0 | 0 | 0 | 0 | 0 | 162 | 135 |
| 0 | 0 | 0 | 0 | 0 | 0 | 0 | 135 | 106 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 4C

| 315 | 0 | 0 | 0 | 0 | 0 | 0 | 0 | 0 | 0 |
|---|---|---|---|---|---|---|---|---|---|
| 342 | 0 | 0 | 0 | 0 | 0 | 0 | 0 | 0 | 0 |
| 0 | 0 | 0 | 0 | 0 | 0 | 0 | 0 | 0 | 0 |
| 333 | 315 | 0 | 0 | 0 | 0 | 0 | 0 | 0 | 0 |
| 333 | 342 | 0 | 0 | 0 | 0 | 0 | 0 | 0 | 0 |
| 0 | 0 | 0 | 0 | 0 | 0 | 0 | 0 | 0 | 0 |
| 342 | 333 | 315 | 0 | 0 | 0 | 0 | 0 | 0 | 0 |
| 315 | 333 | 342 | 0 | 0 | 0 | 0 | 0 | 0 | 0 |
| 0 | 342 | 333 | 315 | 0 | 0 | 0 | 0 | 0 | 0 |
| 0 | 315 | 333 | 342 | 0 | 0 | 0 | 0 | 0 | 0 |
| 0 | 0 | 0 | 0 | 0 | 0 | 0 | 0 | 0 | 0 |
| 0 | 0 | 342 | 333 | 315 | 0 | 0 | 0 | 0 | 0 |
| 0 | 0 | 315 | 315 | 315 | 315 | 0 | 0 | 0 | 0 |
| 0 | 0 | 0 | 315 | 315 | 315 | 315 | 0 | 0 | 0 |
| 90 | 90 | 90 | 90 | 72 | 16 | 0 | 0 | 0 | 0 |
| 90 | 90 | 90 | 90 | 90 | 72 | 45 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

| 0 | 0 | 0 | 15 | 15 | 15 | 15 | 15 |
|---|---|---|----|----|----|----|----|
| 0 | 0 | 0 | 15 | 15 | 15 | 15 | 15 |
| 0 | 0 | 0 | 15 | 15 | 15 | 15 | 15 |
| 0 | 0 | 15 | 15 | 15 | 15 | 15 | 0 |
| 0 | 0 | 15 | 15 | 15 | 15 | 15 | 0 |
| 0 | 0 | 15 | 15 | 15 | 15 | (15) | 0 |
| 0 | 0 | 15 | 15 | 15 | 15 | 15 | 0 |
| 0 | 15 | 15 | 15 | 15 | 15 | 0 | 0 |
| 0 | 15 | 15 | 15 | 15 | 15 | 0 | 0 |

FIG. 9

| 0 | 0 | 0 | 0 | 0 |
|---|---|---|---|---|
| 0 | 15 | (15) | 15 | 15 |
| 15 | 15 | 15 | 15 | 15 |

FIG. 7

| 0 | 0 | 1 | 1 | 0 | 0 | 0 | 5 |
|---|---|---|---|---|---|---|---|
| 0 | 0 | 1 | 1 | 0 | 0 | 0 | 5 |
| 0 | 2 | 2 | 1 | 0 | 0 | 6 | 6 |
| 0 | 1 | 2 | 2 | 0 | 0 | 5 | 6 |
| 0 | 1 | 1 | 0 | 0 | 0 | 5 | 5 |
| 0 | 1 | 1 | 0 | 0 | 0 | 5 | 5 |
| 2 | 2 | 1 | 0 | 0 | 6 | 6 | 5 |
| 1 | 2 | 2 | 0 | 0 | 5 | 6 | 6 |
| 1 | 1 | 0 | 0 | 0 | 5 | 5 | 0 |

FIG. 10

| 2 | 3 | 3 | 3 | 2 |
|---|---|---|---|---|
| 2 | 2 | 3 | 3 | 3 |
| 3 | 2 | 0 | 0 | 0 |

FIG. 8

| 0 | 0 | 60 | 60 | 0 | 0 | 0 | 60 |
|---|---|----|----|---|---|---|----|
| 0 | 0 | 60 | 60 | 0 | 0 | 0 | 60 |
| 0 | 21 | 67 | 47 | 0 | 0 | 21 | 67 |
| 0 | 47 | 67 | 21 | 0 | 0 | 47 | 67 |
| 0 | 60 | 60 | 0 | 0 | 0 | 60 | 60 |
| 0 | 60 | 60 | 0 | 0 | 0 | 60 | 60 |
| 21 | 67 | 47 | 0 | 0 | 21 | 67 | 47 |
| 47 | 67 | 21 | 0 | 0 | 47 | 67 | 21 |
| 60 | 60 | 0 | 0 | 0 | 60 | 60 | 0 |

FIG. 11

| 21 | 47 | 60 | 60 | 67 |
|----|----|----|----|----|
| 67 | 67 | 60 | 60 | 47 |
| 47 | 21 | 0 | 0 | 0 |

FIG. 12

| 15 | 15 | 0 |
|----|----|---|
| 15 | 15 | 0 |
| 15 | 15 | 0 |
| 15 | 15 | 0 |
| 15 | 0  | 0 |

FIG. 13

| 0 | 5 | 6 |
|---|---|---|
| 0 | 5 | 5 |
| 0 | 5 | 5 |
| 6 | 6 | 5 |
| 5 | 6 | 6 |

FIG. 14

| 0  | 47 | 67 |
|----|----|----|
| 0  | 60 | 60 |
| 0  | 60 | 60 |
| 21 | 67 | 47 |
| 47 | 67 | 21 |

FIG. 15

| 0 | 15 | 15 |
|---|----|----|
| 0 | 15 | 15 |
| 0 | 15 | 15 |
| 0 | 15 | 15 |
| 0 | 0  | 15 |

FIG. 16

| 6 | 5 | 0 |
|---|---|---|
| 5 | 5 | 0 |
| 5 | 5 | 0 |
| 5 | 6 | 6 |
| 6 | 6 | 5 |

FIG. 17

| 67 | 47 | 0  |
|----|----|----|
| 60 | 60 | 0  |
| 60 | 60 | 0  |
| 47 | 67 | 21 |
| 27 | 67 | 47 |

FIG. 18

| 0 | 15 | 15 |
|---|----|----|
| 0 | 15 | 15 |
| 0 | 15 | 15 |
| 0 | 15 | 15 |
| 0 | 0  | 15 |

FIG. 19

| 2 | 3 | 0 |
|---|---|---|
| 3 | 3 | 0 |
| 3 | 3 | 0 |
| 3 | 2 | 2 |
| 2 | 2 | 3 |

FIG. 20

| 67 | 47 | 0  |
|----|----|----|
| 60 | 60 | 0  |
| 60 | 60 | 0  |
| 47 | 67 | 21 |
| 21 | 67 | 47 |

FIG. 21

| 0 | 0  | 15 |
|---|----|----|
| 0 | 15 | 15 |
| 0 | 15 | 15 |
| 0 | 15 | 15 |
| 0 | 15 | 15 |

|  |  | V41 | V21 | V11 | V31 | V51 |  |  |
|---|---|---|---|---|---|---|---|---|
|  |  |  | V22 | V12 | V32 |  |  |  |
|  |  |  | V23 | V13 | V33 |  |  |  |
|  |  | V44 | V24 | V14 | V34 | V54 |  |  |
|  |  | V45 | V25 | V15 | V35 | V55 |  |  |
|  |  | V46 | V26 | V16 | V36 | V56 |  |  |
|  |  |  | V27 | V17 | V37 |  |  |  |
|  |  |  | V28 | V18 | V38 |  |  |  |
|  |  | V49 | V29 | V19 | V39 | V59 |  |  |

FIG. 22

(grid with d14, d25, d15, d35, d16)

FIG. 23

(grid with a14, a15, a16)

FIG. 24

|  |  |  |  |  |  | V23 |  |  |
|---|---|---|---|---|---|---|---|---|
|  |  |  |  | V44 | V24 | V13 | V33 |  |
|  |  |  | V45 | V25 | V14 | V34 |  |  |
|  |  | V46 | V26 | V15 | V35 | V54 |  |  |
|  |  | V27 | V16 | V36 | V55 |  |  |  |
|  |  | V17 | V37 | V56 |  |  |  |  |
|  |  |  |  |  |  |  |  |  |

FIG. 25

|  |  |  |  |  |  |  |  |  |
|---|---|---|---|---|---|---|---|---|
|  |  |  |  |  |  |  |  |  |
|  |  |  |  | d25 | d14 |  |  |  |
|  |  |  |  | d15 | d35 |  |  |  |
|  |  |  | d16 |  |  |  |  |  |
|  |  |  |  |  |  |  |  |  |
|  |  |  |  |  |  |  |  |  |

FIG. 26

|  |  |  |  |  |  |  |  |  |
|---|---|---|---|---|---|---|---|---|
|  |  |  |  |  |  |  |  |  |
|  |  |  |  |  | a14 |  |  |  |
|  |  |  |  | a15 |  |  |  |  |
|  |  |  | a16 |  |  |  |  |  |
|  |  |  |  |  |  |  |  |  |
|  |  |  |  |  |  |  |  |  |

FIG. 27

|     |     |     |     |     |     |     |     |     |
| --- | --- | --- | --- | --- | --- | --- | --- | --- |
|     |     |     |     |     |     |     |     |     |
| V49 |     |     | V46 | V45 | V44 |     |     | V41 |
| V29 | V28 | V27 | V26 | V25 | V24 | V23 | V22 | V21 |
| V19 | V18 | V17 | V16 | V15 | V14 | V13 | V12 | V11 |
| V39 | V38 | V37 | V36 | V35 | V34 | V33 | V32 | V31 |
| V59 |     |     | V56 | V55 | V54 |     |     | V51 |
|     |     |     |     |     |     |     |     |     |
|     |     |     |     |     |     |     |     |     |

FIG. 28

|     |     |     |     |     |     |     |     |     |
| --- | --- | --- | --- | --- | --- | --- | --- | --- |
|     |     |     |     |     |     |     |     |     |
|     |     |     |     |     |     |     |     |     |
|     |     |     |     | d25 |     |     |     |     |
|     |     |     | d16 | d15 | d14 |     |     |     |
|     |     |     |     | d35 |     |     |     |     |
|     |     |     |     |     |     |     |     |     |
|     |     |     |     |     |     |     |     |     |
|     |     |     |     |     |     |     |     |     |

FIG. 29

|     |     |     |     |     |     |     |     |     |
| --- | --- | --- | --- | --- | --- | --- | --- | --- |
|     |     |     |     |     |     |     |     |     |
|     |     |     |     |     |     |     |     |     |
|     |     |     |     |     |     |     |     |     |
|     |     |     | a16 | a15 | a14 |     |     |     |
|     |     |     |     |     |     |     |     |     |
|     |     |     |     |     |     |     |     |     |
|     |     |     |     |     |     |     |     |     |
|     |     |     |     |     |     |     |     |     |

|   |   | V51 | V31 | V11 | V21 | V41 |   |   |
|---|---|---|---|---|---|---|---|---|
|   |   |   | V32 | V12 | V22 |   |   |   |
|   |   |   | V33 | V13 | V23 |   |   |   |
|   |   | V54 | V34 | V14 | V24 | V44 |   |   |
|   |   | V55 | V35 | V15 | V25 | V45 |   |   |
|   |   | V56 | V36 | V16 | V26 | V46 |   |   |
|   |   |   | V37 | V17 | V27 |   |   |   |
|   |   |   | V38 | V18 | V28 |   |   |   |
|   |   | V59 | V39 | V19 | V29 | V49 |   |   |

FIG. 34

|   |   |   |   |   |   |   |   |   |
|---|---|---|---|---|---|---|---|---|
|   |   |   |   |   |   |   |   |   |
|   |   |   |   |   |   |   |   |   |
|   |   |   |   | d14 |   |   |   |   |
|   |   |   | d35 | d15 | d25 |   |   |   |
|   |   |   |   | d16 |   |   |   |   |
|   |   |   |   |   |   |   |   |   |
|   |   |   |   |   |   |   |   |   |
|   |   |   |   |   |   |   |   |   |

FIG. 35

|   |   |   |   |   |   |   |   |   |
|---|---|---|---|---|---|---|---|---|
|   |   |   |   |   |   |   |   |   |
|   |   |   |   |   |   |   |   |   |
|   |   |   |   | a14 |   |   |   |   |
|   |   |   |   | a15 |   |   |   |   |
|   |   |   |   | a16 |   |   |   |   |
|   |   |   |   |   |   |   |   |   |
|   |   |   |   |   |   |   |   |   |
|   |   |   |   |   |   |   |   |   |

FIG. 36

|   |   |   |   |   |   | V33 |   |   |
|---|---|---|---|---|---|---|---|---|
|   |   |   |   | V54 | V34 | V13 | V23 |   |
|   |   |   | V55 | V35 | V14 | V24 |   |   |
|   |   | V56 | V36 | V15 | V25 | V44 |   |   |
|   |   | V37 | V16 | V26 | V45 |   |   |   |
|   |   | V17 | V27 | V46 |   |   |   |   |

FIG. 37

|   |   |   |   |   |   |   |   |   |
|---|---|---|---|---|---|---|---|---|
|   |   |   |   | d35 | d14 |   |   |   |
|   |   |   |   | d15 | d25 |   |   |   |
|   |   |   | d16 |   |   |   |   |   |

FIG. 38

|   |   |   |   |   |   |   |   |   |
|---|---|---|---|---|---|---|---|---|
|   |   |   |   |   | a14 |   |   |   |
|   |   |   |   | a15 |   |   |   |   |
|   |   |   | a16 |   |   |   |   |   |

FIG. 39

|     |     |     |     |     |     |     |     |
|-----|-----|-----|-----|-----|-----|-----|-----|
|     |     |     |     |     |     |     |     |
| V59 |     |     | V56 | V55 | V54 |     | V51 |
| V39 | V38 | V37 | V36 | V35 | V34 | V33 | V32 | V31 |
| V19 | V18 | V17 | V16 | V15 | V14 | V13 | V12 | V11 |
| V29 | V28 | V27 | V26 | V25 | V24 | V23 | V22 | V21 |
| V49 |     |     | V46 | V45 | V44 |     | V41 |
|     |     |     |     |     |     |     |     |
|     |     |     |     |     |     |     |     |

FIG. 40

|   |   |   |   |   |   |   |   |   |
|---|---|---|---|---|---|---|---|---|
|   |   |   |   |   |   |   |   |   |
|   |   |   |   |   |   |   |   |   |
|   |   |   |   |   |   |   |   |   |
|   |   |   |   | d35 |   |   |   |   |
|   |   |   | d16 | d15 | d14 |   |   |   |
|   |   |   |   | d25 |   |   |   |   |
|   |   |   |   |   |   |   |   |   |
|   |   |   |   |   |   |   |   |   |
|   |   |   |   |   |   |   |   |   |
|   |   |   |   |   |   |   |   |   |

FIG. 41

|   |   |   |   |   |   |   |   |   |
|---|---|---|---|---|---|---|---|---|
|   |   |   |   |   |   |   |   |   |
|   |   |   |   |   |   |   |   |   |
|   |   |   |   |   |   |   |   |   |
|   |   |   |   |   |   |   |   |   |
|   |   |   | a16 | a15 | a14 |   |   |   |
|   |   |   |   |   |   |   |   |   |
|   |   |   |   |   |   |   |   |   |
|   |   |   |   |   |   |   |   |   |
|   |   |   |   |   |   |   |   |   |

FIG. 42

|  |  |  |  |  |  |  |  |
|---|---|---|---|---|---|---|---|
|  |  | V33 |  |  |  |  |  |
|  | V23 | V13 | V34 | V54 |  |  |  |
|  |  | V24 | V14 | V35 | V55 |  |  |
|  |  | V44 | V25 | V15 | V36 | V56 |  |
|  |  |  | V45 | V26 | V16 | V37 |  |
|  |  |  |  | V46 | V27 | V17 |  |
|  |  |  |  |  |  |  |  |
|  |  |  |  |  |  |  |  |

FIG. 43

|  |  |  |  |  |  |  |  |
|---|---|---|---|---|---|---|---|
|  |  |  |  |  |  |  |  |
|  |  |  |  |  |  |  |  |
|  |  |  | d14 | d35 |  |  |  |
|  |  |  | d25 | d15 |  |  |  |
|  |  |  |  |  | d16 |  |  |
|  |  |  |  |  |  |  |  |
|  |  |  |  |  |  |  |  |
|  |  |  |  |  |  |  |  |

FIG. 44

|  |  |  |  |  |  |  |  |
|---|---|---|---|---|---|---|---|
|  |  |  |  |  |  |  |  |
|  |  |  |  |  |  |  |  |
|  |  |  | a14 |  |  |  |  |
|  |  |  |  | a15 |  |  |  |
|  |  |  |  |  | a16 |  |  |
|  |  |  |  |  |  |  |  |
|  |  |  |  |  |  |  |  |
|  |  |  |  |  |  |  |  |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 15 | 15 | 15 | 0 | 0 | 0 | 0 | 0 |
| 0 | 0 | 0 | 15 | 15 | 15 | 15 | 15 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 47

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 3 | 3 | 3 | 4 | 0 | 0 | 0 | 0 |
| 0 | 0 | 4 | 3 | 3 | 3 | 3 | 3 |
| 7 | 7 | 7 | 8 | 0 | 0 | 0 | 0 |
| 0 | 0 | 8 | 7 | 7 | 7 | 7 | 7 |
| 0 | 0 | 0 | 0 | 0 | 0 | 0 | 0 |
| 0 | 0 | 0 | 0 | 0 | 0 | 0 | 0 |

FIG. 48

| 0 | 0 | 0 | 15 | 0 | 0 | 0 | 0 |
|---|---|---|----|---|---|---|---|
| 0 | 0 | 0 | 15 | 0 | 0 | 0 | 0 |
| 0 | 0 | 0 | 15 | 0 | 0 | 0 | 0 |
| 0 | 0 | 0 | 15 | 0 | 0 | 0 | 0 |
| 0 | 0 | 0 | 15 | 0 | 0 | 0 | 0 |
| 0 | 0 | 15 | 0 | 0 | 0 | 0 | 0 |
| 0 | 0 | 15 | 0 | 0 | 0 | 0 | 0 |
| 0 | 0 | 15 | 0 | 0 | 0 | 0 | 0 |
| 0 | 0 | 15 | 0 | 0 | 0 | 0 | 0 |

FIG. 49

| 0 | 0 | 1 | 0 | 5 | 0 | 0 | 0 |
|---|---|---|---|---|---|---|---|
| 0 | 0 | 1 | 0 | 5 | 0 | 0 | 0 |
| 0 | 0 | 1 | 0 | 5 | 0 | 0 | 0 |
| 0 | 0 | 1 | 0 | 5 | 0 | 0 | 0 |
| 0 | 2 | 1 | 0 | 5 | 0 | 0 | 0 |
| 0 | 1 | 2 | 5 | 6 | 0 | 0 | 0 |
| 0 | 1 | 0 | 5 | 0 | 0 | 0 | 0 |
| 0 | 1 | 0 | 5 | 0 | 0 | 0 | 0 |
| 0 | 1 | 0 | 5 | 0 | 0 | 0 | 0 |

FIG. 50

| 15 | 15 | 7 |
|----|----|---|
| 15 | 15 | 5 |
| 15 | 11 | 0 |
| 15 | 9  | 0 |
| 15 | 7  | 0 |

| 0 | 0 | 0 | 15 | 0 | 0 | 0 | 0 |
|---|---|---|---|---|---|---|---|
| 0 | 0 | 0 | 15 | 0 | 0 | 0 | 0 |
| 0 | 0 | 0 | 15 | 0 | 0 | 0 | 0 |
| 0 | 0 | 0 | 15 | 0 | 0 | 0 | 0 |
| 0 | 0 | 15 | 15 | 0 | 0 | 0 | 0 |
| 0 | 0 | 15 | 0 | 0 | 0 | 0 | 0 |
| 0 | 0 | 15 | 0 | 0 | 0 | 0 | 0 |
| 0 | 0 | 15 | 0 | 0 | 0 | 0 | 0 |
| 0 | 0 | 15 | 0 | 0 | 0 | 0 | 0 |

RESOLUTION ENHANCEMENT SYSTEM FOR BINARY IMAGES

CROSS-REFERENCE TO RELATED APPLICATION

This application is related to U.S. application Ser. No. 07/983,169, filed on Nov. 30, 1992 in the name of Yee S. Ng et al and entitled "Resolution Enhancement System for Combined Binary and Gray Scale Halftone Images" and now U.S. Pat. No. 5,450,531, and to application Ser. No. 08/475,447, filed on Jun. 7, 1995, entitled "Resolution Enhancement System for Combined Binary and Gray Scale Halftone Images" which is a continuation of U.S. application Ser. No. 07/983,169.

1. Field of the Invention

The invention relates generally to digital image processing and, more specifically, to a digital image processing system for enhancing the edge characteristics of printed images that are generated from low resolution binary image data.

2. Background

Edge or line jaggedness is a common problem associated with the printing of low resolution binary image data. Efforts have been made to reduce or overcome line jaggedness using template matching methods that are applied to low resolution bitmaps as described in U.S. Pat. No. 5,005,139 or, alternatively, through the use of an outline extraction method like that described in the article entitled "Image Makers", by Henry Bortman, MacUser, November 1991, pp. 98–103. Both of the above-referenced methods use a low resolution bitmap as an input file and both methods perform digital processing operations on the low resolution bitmap to produce an enhanced image output file. The enhanced output file is supplied to the printhead of a printer to produce a hardcopy of the image.

There are disadvantages, however, to both of the template matching and outline extraction methods of edge enhancement discussed above. In the template matching method, the number of templates that can be employed must be limited in order to maintain acceptable processing speeds. If a pattern within the bitmap data contained in the input file does not happen to match one of the available templates, an edge resolution enhancement operation cannot be performed, regardless of the quality of the image that will be produced from the input data. In the outline extraction method, variable dot sizes are used to "fill in" and match a character's outline. The fill in process, however, can be difficult when small fonts are employed. In addition, the outline extraction method tends to broaden thin graph lines that are spaced close together, which results in the merger of multiple lines and a perceivable reduction in the resolution of the printed image.

In view of the above, it is an object of the invention to provide a method and apparatus for providing edge enhancement using a low resolution bitmap as an input file without suffering the resolution degradation associated with the outline extraction method and the drawbacks of the template matching method outlined above.

SUMMARY OF THE INVENTION

The invention provides a system for performing edge enhancement of low resolution binary image files that is flexible and adaptable to high speed processing operations without causing a degradation in image resolution. Operations are performed by the system to obtain outline gradient magnitudes and directions which are used, in combination with the original bitmap data, to reduce the tangential gradient magnitude change (jaggedness) of lines or text within a printed image while preserving the gradient angle (shape of the line or text) without sacrificing the normal gradient magnitude (sharpness of the line or text).

Specifically, the system processes the low resolution bitmap data in sections or windows to determine whether an edge transition or "kink site" occurs within each window. The original bitmap data in the window is then replaced with edge enhanced grey scale data if a kink site is identified. The selection of the correct edge enhanced grey scale data to be used in place of the original bitmap data is based on whether the central pixel contained within the window is a black or white pixel, whether the central pixel is located on a single pixel line, and the location of the central pixel with respect to the kink site. The determination of whether the central pixel is a black or white pixel is based on the binary value assigned to the pixel, the determination of the location of the central pixel with respect to the kink site is based on pixel values and gradient magnitudes of surrounding pixel locations, and the determination of whether the central pixel is located on a single pixel line is based on the gradient magnitude of the central pixel and surrounding pixel locations.

Preferably, the system determines the gradient angles of the pixels contained within the window prior to performing the operations described above. A limited number of gradient directions are then assigned to the pixels based on the gradient angles. The system uses the gradient directions to rotate the window to a selected reference direction in order to simplify the identification of kink sites within the window and the selection of the edge enhanced grey scale data as will be described in greater detail below.

BRIEF DESCRIPTION OF THE DRAWINGS

With the above as background, reference should now be made to the following description of the best mode for carrying out the invention and the accompanying drawings, wherein:

FIG. 2 is an example of binary bitmap data applied to the input of the edge enhancement processing system shown in FIG. 1;

FIG. 3 is a gradient magnitude map of the binary bitmap data shown in FIG. 2;

FIG. 6 illustrates a 9×9 window of binary data for a near vertical line;

FIG. 7 illustrates the gradient directions corresponding to each pixel location of the window shown in FIG. 6;

FIG. 8 illustrates the gradient magnitudes corresponding to each pixel location of the window shown in FIG. 6;

FIG. 9 illustrates a 3×5 window of binary data for a near horizontal line;

FIG. 10 illustrates the gradient directions corresponding to each pixel location of the window shown in FIG. 9;

FIG. 11 illustrates the gradient magnitudes corresponding to each pixel location of the window shown in FIG. 9;

FIGS. 12–14 respectively illustrate pixel values, gradient directions and gradient magnitudes for a 3×5 window of pixels surrounding a kink site located in the 9×9 window of FIG. 6;

FIGS. 15–17 respectively illustrate the pixel values, gradient directions and gradient magnitudes shown in FIGS. 12–14 rotated to a preferred orientation;

FIGS. 18–20 respectively illustrate the pixel values, gradient directions and gradient magnitudes shown in FIGS. 9–11 rotated to a preferred orientation;

FIG. 21 illustrates a template that is utilized to identify a kink site;

FIGS. 22–24 respectively illustrate the pixel value, gradient direction and gradient magnitude maps for a central pixel having a gradient direction of one;

FIGS. 25–27 respectively illustrate the pixel value, gradient direction and gradient magnitude maps for a central pixel having a gradient direction of two;

FIGS. 28–30 respectively illustrate the pixel value, gradient direction and gradient magnitude maps for a central pixel having a gradient direction of three;

Figures 31, 32, 33:
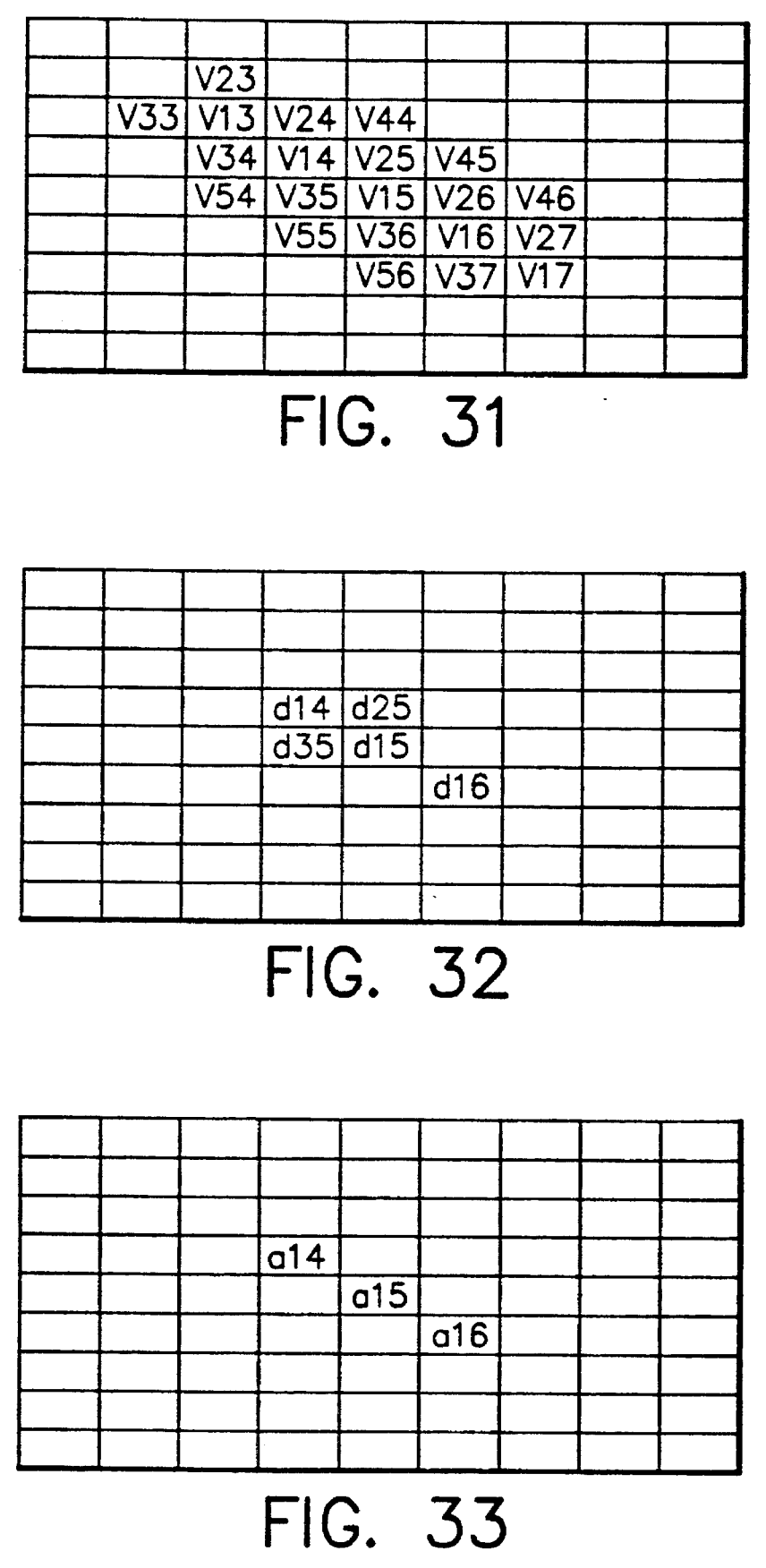

FIGS. 31–35 respectively illustrate the pixel value, gradient direction and gradient magnitude maps for a central pixel having a gradient direction of four;

FIGS. 34–36 respectively illustrate the pixel value, gradient direction and gradient magnitude maps for a central pixel having a gradient direction of five;

FIGS. 37–39 respectively illustrate the pixel value, gradient direction and gradient magnitude maps for a central pixel having a gradient direction of six;

FIGS. 40–42 respectively illustrate the pixel value, gradient direction and gradient magnitude maps for a central pixel having a gradient direction of seven;

FIGS. 43–45 respectively illustrate the pixel value, gradient direction and gradient magnitude maps for a central pixel having a gradient direction of eight;

FIG. 46 is a window illustrating a one pixel wide horizontal line;

FIG. 47 illustrates the gradient directions corresponding to the pixel locations shown in FIG. 46;

FIG. 48 is a window illustrating a one pixel wide vertical line;

FIG. 49 illustrates the gradient directions corresponding to the pixel locations shown in FIG. 48;

FIG. 50 is an example of enhanced gray-scale output data corresponding to the original binary image data illustrated in FIG. 12; and FIG. 51 is a window illustrating a one-pixel wide vertical line where a first pixel of a kink site overlaps an adjacent pixel.

BEST MODE OF CARRYING OUT THE INVENTION

Figure 1:
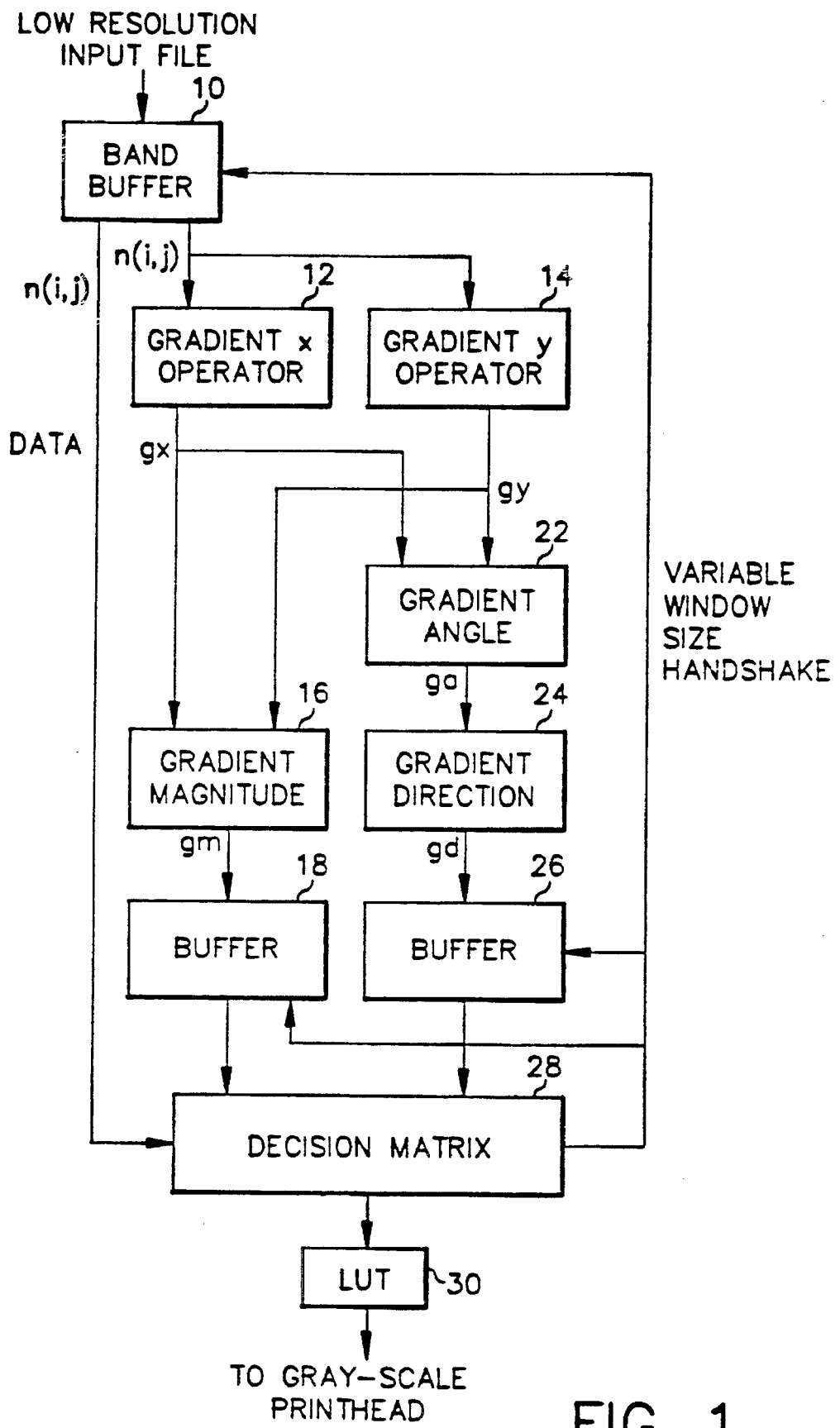
FIG. 1 is a functional block diagram of an edge enhancement processing system in accordance with the invention.

A functional block diagram of an edge enhancement processing system in accordance with the invention is illustrated in FIG. 1. A low resolution binary bitmap (300 dpi), generated for example by using a commercially available software package such as PostScript, is stored in a band buffer 10, where N(i,j) is a pixel value within the bitmap at location (i,j). The term "binary" bitmap or image will be understood by those skilled in the art to refer to a bitmap or image in which image pixels are either fully exposed or are unexposed, i.e. no gray-scale pixel data is present. An example of such a binary bitmap for a portion of the letter "R" is illustrated in FIG. 2, in which exposed areas of an image (in the illustrated embodiment) are identified by the numeral 255 (i.e. pixel exposed) and non-exposed areas are identified by zero (i.e. pixel not exposed).

Sobel gradient masks 12, 14 for both the horizontal (sobelx) and vertical (sobely) directions operate on the binary bitmap data in to produce a gradient x operator (gx) and a gradient y operator (gy). Typical Sobel gradient masks that can be employed include:

sobelx=(−1 0 1, −2 0 2, −1 0 1)

where $gx(i,j)=sobelx*n(i,j)$; and sobely=(−1 −2 −1, 0 0 0, 1 2 1)

where $gy(i,j)=sobely*n(i,j)$

The gradient magnitude (gm) 16 is then calculated by taking the square root of the sum of the square of the gradient x operator (gx) and the square of gradient y operator (gy) for each location in the bitmap to produce a gradient magnitude map, as shown in FIG. 3. The gradient magnitude map is then stored in a buffer 18 for later use.

$$gm(i,j)=sqrt(gx(i,j)2+gy(i,j)2)$$

Figure 4A:
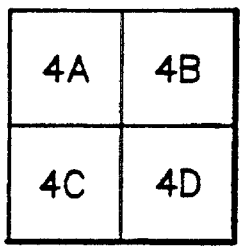
FIG. 4 is a gradient angle map of the binary bitmap data shown in FIG. 2.

Similarly, the gradient angle (ga) 20 is determined for each location using the equation:

$$ga(i,j)=\tan-1(gy(i,j)/gx(i,j))$$

to produce a gradient angle map 22 as shown in FIG. 4. It should be noted that an arctangent calculation can also be employed to calculate ga if desired.

For purposes of convenience, the gradient angle ga is preferably limited to a choice of gradient directions gd by a gradient direction sorter 24. For example, eight directions are preferably employed using the following sort criteria:

gd=2, if (68°>=ga>23°)

gd=3, if (113°>=ga>68°)

gd=4, if (158°>=ga>113°)

gd=5, if (203°>=ga>158°)

gd=6, if (248°>=ga>203°)

gd=7, if (293°>=ga>248°)

gd=8, if (338°>=ga>293°)

gd=1, if ga is between 338 and 23 degrees and gm isn't zero gd=0, if gm=0

The gradient direction for each location is also stored in a buffer 26. It should be noted that the use of a finer separation criteria (i.e. more than eight directions) for gd can be employed if desired.

The original bitmap data and the gradient magnitudes gm and gradient directions gd corresponding thereto are supplied to a decision matrix 28, which uses this information to select edge enhanced gray-scale output data to replace the original binary bitmap data. In a preferred mode of operation, the decision matrix 28 determines whether the central pixel of a window of the original bitmap data is a black or white pixel, whether the central pixel is contained in a single pixel line and the position of the pixel with respect to a kink site, by comparing the pixel data to a predetermined pixel value and gradient magnitude templates. Once a template match is established, the decision matrix generates an address that is supplied to a LUT 30. The LUT 30 generates edge enhanced gray-scale output data based on the address generated by the decision matrix 28. The enhanced grey scale output data replaces the original binary input data and produces a smoother image without jagged edges when applied to a grey scale printhead (for example a laser, LED or thermal printhead) of a printer.

It should be noted that the illustrated system can be implemented as computer program executed on a general purpose computer, in hardware as a pipelined processing system, preferably in the form of an application specific integrated circuit (ASIC), or a combination thereof. Processing speeds can be improved by precalculating the gradient magnitudes and directions for all possible combinations of binary data within the window and storing the precalculated values within gradient magnitude and gradient direction LUTs. In operation, a window of binary data is supplied as an address to the gradient magnitude and gradient direction LUTs which then generate corresponding gradient magnitude and directions maps. The operation of the decision matrix can similarly be implemented with LUTs by supplying the original binary input data and corresponding gradient magnitude and direction information as an address thereto.

Figure 5A:
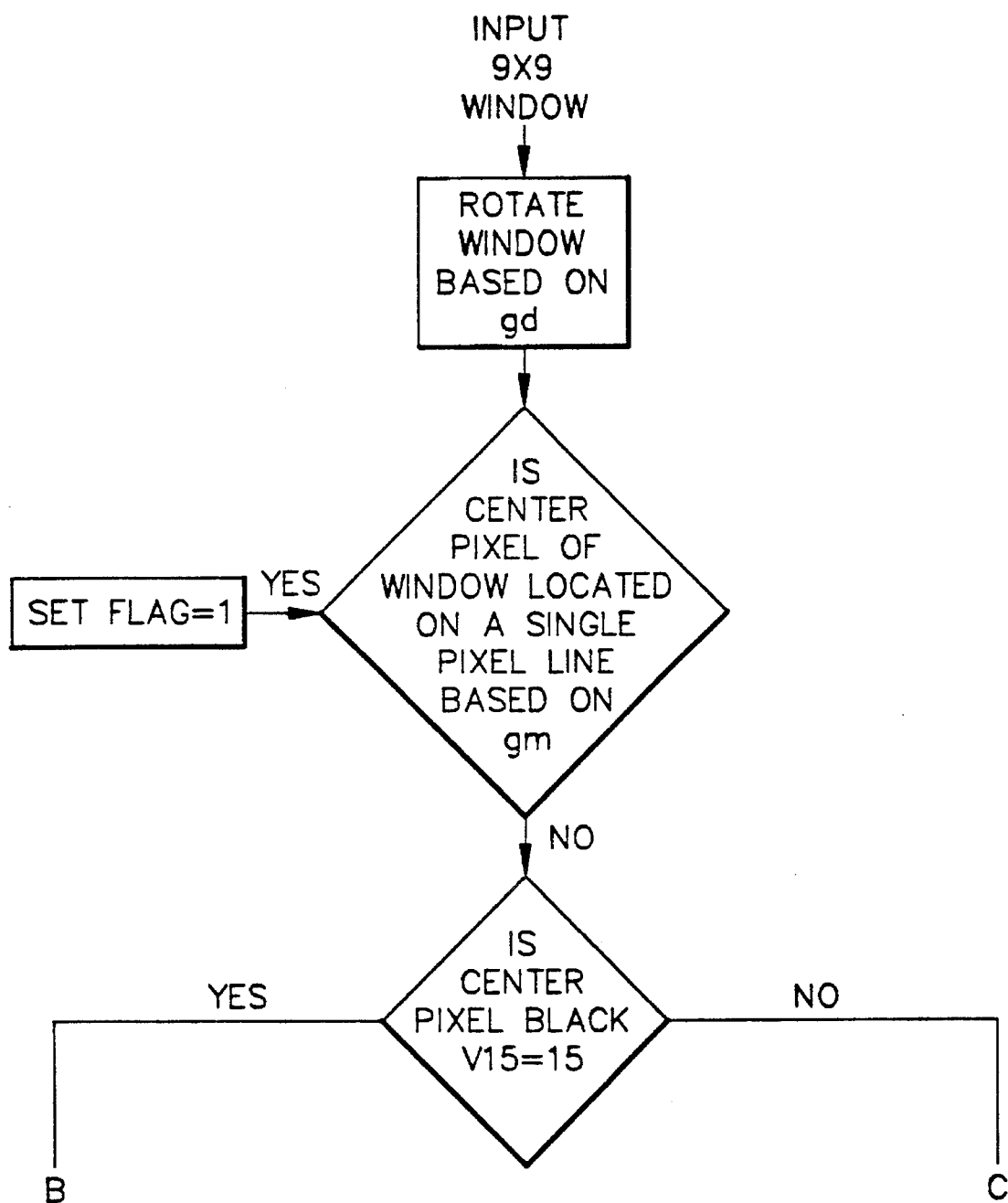
FIG. 5 is a functional flow diagram of the operation of the decision matrix employed in the edge enhancement processing system shown in FIG. 1.
Figure 5B:
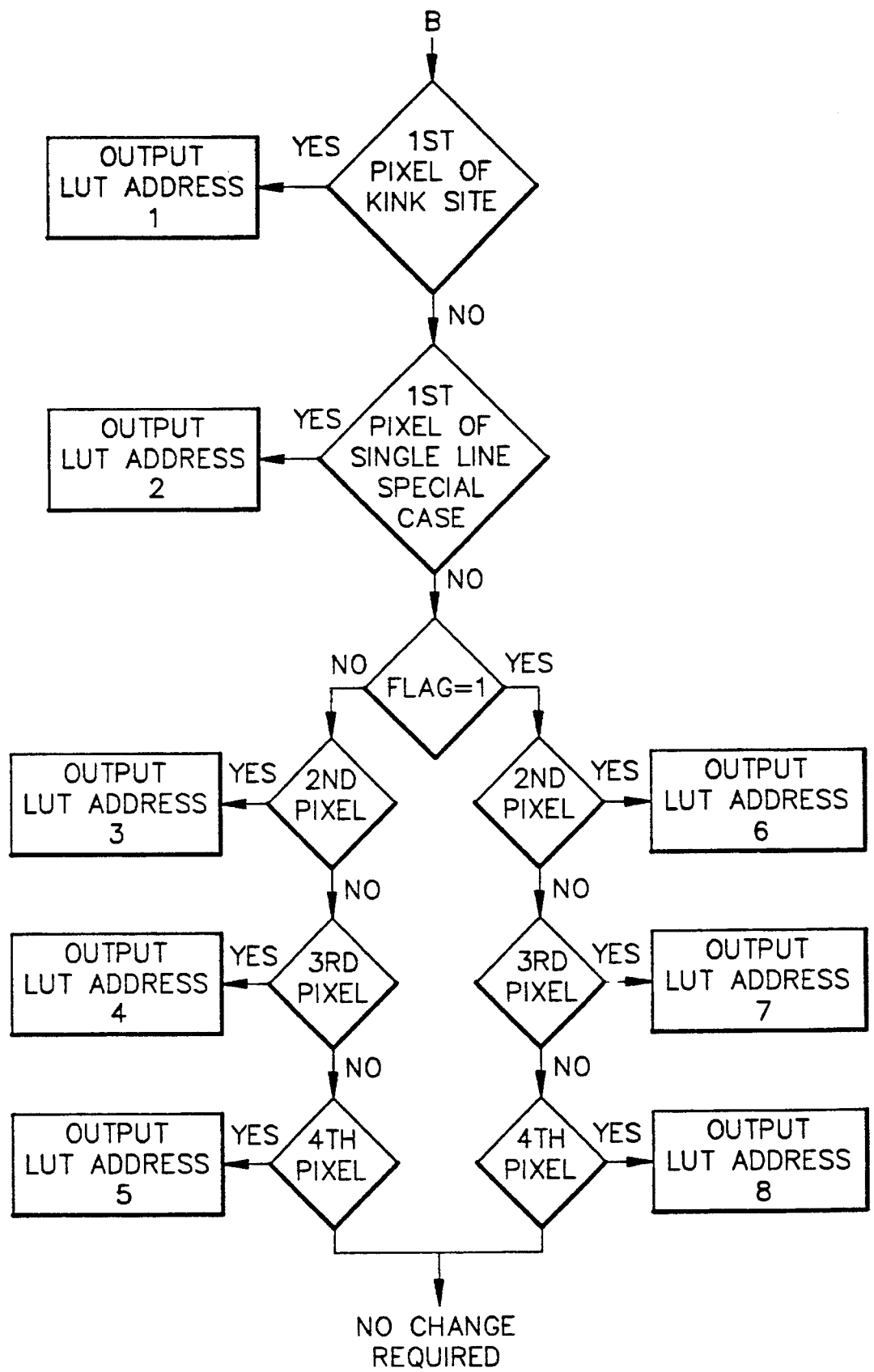
Figure 5C:
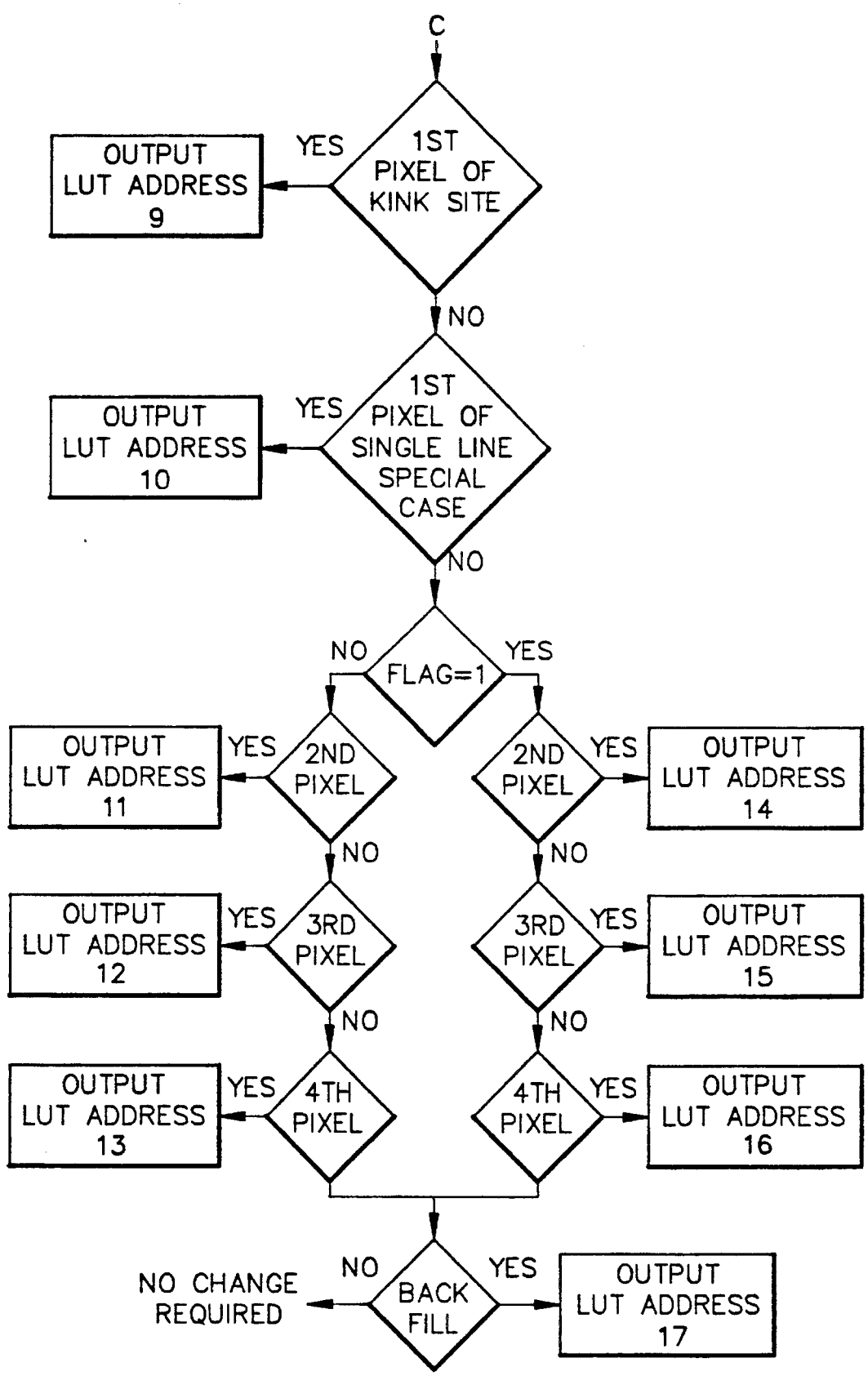

A general flow diagram of the operation of a decision matrix as implemented in software is illustrated by the decision tree in FIG. 5. FIG. 6 illustrates a 9×9 window of data retrieved from the original binary bitmap data previously stored in the band buffer. The pixel values illustrated in FIG. 6 are for a section of a near vertical line that is greater than one pixel in width. FIGS. 7 and 8 respectively illustrate the gradient directions and magnitudes corresponding to each of the pixel values illustrated in FIG. 6. In this example, exposed pixels are denoted by the numeral fifteen and non-exposed pixels are denoted by zero.

The decision matrix first orients the pixel data via a rotation operation in order to decrease the number of template matches that will be required to identify kink sites requiring edge correction. For example, a near vertical edge (see the circled second black pixel of a kink site shown in FIG. 6) can either be approached from the left (gd=1) or the right (gd=5), while a near horizontal line can be approached either from the top (gd=3) or the bottom (gd=7). An example of a near horizontal line segment shown in FIG. 9–11. In the case of the vertical line approached from the right, a 3×5 window of pixels surrounding the second black pixel of the kink site of the near vertical line, as shown in FIGS. 12–14, can be rotated to a position illustrated in FIGS. 15–17 based on the direction of the second black pixel. Similarly, a 3×5 window of pixels surrounding the second black pixel (circled) of the kink site of the near horizontal line as shown in FIGS. 9–11 can also be rotated to a position illustrated in FIGS. 18–20. As the pixel values are identical for the rotated segments as shown in FIGS. 15 and 18, a single template match can be used to identify kink sites in both near vertical lines approached from the right and the near horizontal lines approached from the top, and the same enhanced gray-scale data can therefore be employed to smooth the kink site in both cases. In fact, all of the near vertical and near horizontal lines (for all four possible directions of approach) can be sorted through the rotation operation into a template matching the pixel configuration of FIGS. 15 and 18 or a template matching the configuration shown in FIG. 21, rather than the eight templates that would be required (two for each direction) if rotation were not employed. A similar procedure is utilized for near diagonal line segments (i.e. gd=2, 4, 6 or 8).

The rotation of the pixels within the windows is accomplished by a simple remapping routine. FIGS. 22–45 illustrate how the pixel values, gradient magnitudes and gradient directions correspond for each direction. For purposes of illustration, the pixel values for each pixel within the 9×9 window are denoted as $V(x\ y)$, where V is the pixel value, x is a row position within the 9×9 window and y is a pixel position within the row. For example, as shown in FIG. 22, the pixel value of the central pixel within the 9×9 window is denoted by V15. Similarly, the gradient direction and magnitude for each pixel within the window is respectively denoted by $d(x\ y)$ and $a(x\ y)$.

In addition to rotating the pixel window to a predetermined direction, the pixel value of the central pixel within the window is analyzed to determine whether the pixel is a black pixel or a white pixel, whether the central pixel is located within a single pixel line, and the location of the central pixel with respect to the kink site, as each of these factors can influence the type of enhanced data utilized to smooth the kink site. The determination of whether the pixel is black or white is made by a simple comparison of the pixel value to the value assigned to an exposed pixel. For example, in the embodiment just discussed, the central pixel is a black pixel if the pixel value is fifteen (V15=15) and the central pixel is a white pixel if the pixel value is zero (V15=0). The determination of whether the central pixel is located within a single pixel line is made by comparing the gradient direction of central pixel to the gradient directions of surrounding pixels. For example, for a horizontal single line illustrated in FIG. 46, the second black pixel from the kink site has a direction of zero, while the pixel location above the second black pixel has a direction of three and the pixel location below the second black pixel has a direction of seven. Similarly, the second black pixel from a kink site of a vertical single pixel line shown in FIG. 47 has a direction of zero, while the pixel location to the left has a direction of one and the pixel location to the right has a direction of five. The determination of the location of the pixel with respect to the kink site is based on the gradient magnitude of the pixel location and adjacent pixel locations. For example, the gradient magnitude will always be the highest value for the first pixel location of the kink site. Thus, the pixel values and gradient amplitudes can be compared with a template to determine whether the central pixel is the first, second, third or fourth pixel from the kink site. If desired, a backfill template can also be employed if a white pixel is not identified as the first through fourth pixel from a kink site.

As shown in FIG. 5, it is preferable to make the decision of whether the pixel is a white or black pixel and then proceed immediately with a determination of whether the pixel is the first pixel of a kink site, before making a determination of whether the pixel is the first pixel of a single line. If the pixel does not fall into one of this two categories, a general decision is made as to whether the pixel is in a single line. The determination of whether the pixel is the first pixel of a single line is made on a different criteria than the criteria used for the general decision in the subsequent step, in order to cover a special case where the first pixel of the kink site in a single line overlaps an adjacent pixel instead as shown in FIG. 51. If a criteria were used in which a change in direction were required from both sides of the pixel in order to identify a single pixel line, the case of the overlapped first pixel would not be caught.

The following are examples of comparisons that are preferably applied to the pixel values and gradient magnitudes to determine whether the central pixel is:

a) the first black pixel of a kink site (not a single pixel line) if: a15>a14 & a15>a16 & V35≠0 & V25=0 & V26=0 & V45=0 & V36≠0 & V55≠0 & ((V24≠0 V16=0 & V14≠0) or (V27≠0 & V14=0 & V16≠0));

b) the first black pixel of a kink site in a single pixel line if: (V15≠0 & (V14≠0 & V13≠0 & V16=0 & V17=0 & ((V26≠0 & V27≠0 & V24=0 & V23=0) or (V36≠0 & V37≠0 & V34=0 & V33=0))) or (V16≠0 & V17≠0 & V13=0 V14=0 & ((V23≠0 & V24≠0 & V26=0 & V27=0) or (V33≠0 & V34≠0 & V36=0 V37=0)))); and c) the first white pixel of a kink site in a single pixel line if: (V15=0 & V35≠0 & ((V13=0 & V14=0 & V16≠0 & V17≠0 & V34≠0) or (V13≠0 & V14≠0 & V16=0 & V17=0 & V36≠0)) & ((a15>a14 & a15<=a16) or (a15<=a14 & a15>a16))).

Similar criteria are used for each of the other decisions illustrated in FIG. 5. Once a match is established, an address is generated and supplied to the LUT in order to generate corresponding enhanced gray-scale data which is subsequently supplied to the grey scale print head of a printer. See, for example, the enhanced gray-scale data shown in FIG. 50 which corresponds to the original data shown in FIG. 12. The actual values of the enhanced gray-scale data to be utilized in place of the binary input data depends on the characteristics of the printer to which the enhanced data is to be supplied and on a subjective determination of what is considered acceptable to the end viewers of the printed images. The original binary bitmap data is used in no match occurs.

Some basic rules, however, do apply in generating the enhanced data to be stored in the LUT. For example, looking at some kink sites in the down stroke of the letter R in the gradient magnitude map of FIG. 3 and the gradient angle map of FIG. 4, it is noted that the gradient magnitude is at a peak value right at the kink site with respect to the gradient magnitude of the pixels along the gradient direction (the gradient direction being along the tangential direction of the line). Thus, for an exposed pixel, it is desirable to reduce the exposure at that kink site to reduce jaggedness. In contrast, it is desirable to increase the exposure of the white pixel at the kink site, which also has the gradient magnitude at its peak, to reduce line jaggedness, provided that one of the pixel values along the gradient direction is not zero which signifies that the white kink site is indeed a kink site. Similar sets of rules can be written to take care of black or white pixels at a certain distance to the kink site to have a gradual line width change to reduce tangential gradient magnitude changes. It should be noted that the exposure value of the exposed and non-exposed pixels is not changed on the upper portion of the letter R, since no kink site is defined (gradient change along the gradient direction of search turns out a similar gradient magnitude). Therefore the normal gradient magnitude or sharpness of the letter is not reduced. Other rules can be written to take care of single pixels.

The system preferably makes use of a variable window depending on the gradient angle (or direction) change of the pixels along the gradient angle. For example, the problem of line jaggedness usually occurs at near horizontal and near vertical lines. For the case of a near horizontal line, a larger window (preferably rectangular with a long axis in the direction of the line segment) along the direction of the gradient direction can be utilized. If the gradient direction of the pixels is not changing much, a longer window is used. For 400 dpi, about 20 pixels window in one direction is about right or 10 pixels from the original position on both sides. Then if a kink site is hit, usually signifying a large change in gradient magnitude and direction—like from an angle of 180 to 153 degree change in a near vertical case—, the current pixel location with respect to the kink site will give the LUT necessary information for the modification.

An advantage of the edge enhancement system is that it is not necessary to provide every possible template, since the eight directions can actually use the same template due to the rotation employed, thereby providing a reduction in the template size when compared with conventional template matching methods. In addition, the edge enhancement system reduces line jaggedness with little sharpness degradation, in contrast to conventional outline extraction methods in which the outline of the text is traced by linking the maximum gradient magnitude points together. The outline extraction method runs into problems when the fonts in the image to be printed become smaller or when there are multiple single pixel line segments that are closely spaced.

The invention has been described with reference to certain preferred embodiments thereof. It will be understood, however, that modifications and variations can be made within the scope of the appended claims.

Industrial Utility

The invention can be utilized to process any low resolution binary image file for printing on any type of gray-scale printer including those employing lasers, LEDs or thermal printing elements.

What is claimed is:

1. An image processing system comprising: means for storing a binary bitmap image file including a plurality of pixel locations; means for determining a gradient magnitude corresponding to each pixel location of the binary bitmap image file; means for determining a gradient direction corresponding to each pixel location of the binary bitmap image file; decision matrix means for comparing a window of the binary bitmap image file and the gradient magnitudes and directions corresponding thereto to predetermined templates and generating a look-up-table address if a match occurs; a look-up-table for generating enhanced gray-scale image data in response to the look-up-table address and wherein the decision matrix means determines whether a central pixel of the window is a black or white pixel, whether the central pixel is located in a single pixel width line, and the location of the central pixel with respect to a kink site.

2. A system of claim 1 in combination with a gray-scale printer.

3. A system of claim 1 in combination with a gray-scale display.

4. An image processing system for processing an image represented by binary image data to generate modified binary image data that is enhanced with gray-scale image data to reduce jaggedness in the image, said system comprising: means for storing a bitmap image file including a plurality of pixel locations with respective pixels defined by binary image data; means for determining a gradient magnitude corresponding to each pixel location of the bitmap image file wherein a respective pixel is defined by binary image data; means for determining a gradient direction corresponding to each pixel location of the bitmap image file wherein a respective pixel is defined by binary image data; decision matrix means for comparing a window of the bitmap image file of binary image data and the gradient magnitudes and directions corresponding thereto to predetermined sets of criteria; and means, responsive to said decision matrix means, for generating modified binary image data that is enhanced with gray-scale image data to reduce jaggedness in the image.

5. A system as claimed in claim 4, wherein said decision matrix means generates a look-up table address in response to said comparing and said means for generating enhanced gray-scale image data is a look-up table.

6. A system as claimed in claim 5, wherein the decision matrix means includes means for rotating a window of the bitmap image file to a predetermined reference direction in response to the gradient direction information corresponding thereto.

7. A system as claimed in claim 6, wherein the decision matrix means determines whether a pixel of a window of the bitmap image file is a black or white pixel, whether this pixel is located in a single pixel width line, and the location of this pixel with respect to a kink site.

8. A system as claimed in claim 5, wherein the decision matrix means determines whether a pixel of a window of the bitmap image file is a black or white pixel, whether this pixel is located in a single pixel width line, and the location of this pixel with respect to a kink site.

9. A system as claimed in claim 4, wherein the decision matrix means includes means for rotating a window of the bitmap image file to a predetermined reference direction in response to the gradient direction information corresponding thereto.

10. A system as claimed in claim 9, wherein the decision matrix means determines whether a pixel of a window of the bitmap image file is a black or white pixel, whether this pixel is located in a single pixel width line, and the location of this pixel with respect to a kink site.

11. A system as claimed in claim 9, wherein the decision matrix means determines whether a central pixel of a window of the bitmap image file is a black or white pixel, whether the central pixel is located in a single pixel width line, and the location of the central pixel with respect to a kink site.

12. A system as claimed in claim 4, wherein the decision matrix means determines whether a pixel of a window of the bitmap image file is a black or white pixel, whether this pixel is located in a single pixel width line, and the location of this pixel with respect to a kink site.

13. A system of claim 4 in combination with a gray-scale printer.

14. A system of claim 4 in combination with a gray-scale display.

15. A method of providing edge enhancement of binary image data comprising the steps of; storing a bitmap image file including a plurality of pixel locations with respective pixels defined by binary image data; determining a gradient magnitude corresponding to each pixel location of the bitmap image file wherein a respective pixel is defined by binary image data; determining a gradient direction corresponding to each pixel location of the bitmap image file wherein a respective pixel is defined by binary image data, comparing a window of the binary image file and the gradient magnitudes and directions corresponding thereto to predetermined sets of criteria, and in response to the comparing, generating modified binary image data that is enhanced with gray-scale image data to reduce jaggedness in the image.

16. A method of claim 15, and including generating a look-up table address in response to said comparing and generating enhanced gray-scale image data from said look-up table.

17. A method as claimed in claim 16 and including the step of rotating a window of the bitmap image file to a predetermined reference direction in response to gradient direction information corresponding thereto.

18. A method as claimed in claim 17 and wherein a determination is made of whether a central pixel of a bitmap window of the bitmap image file is a black or white pixel, whether the central pixel is located in a single pixel width line, and the location of the central pixel with respect to a kink site.

19. A method as claimed in claim 16 and wherein a determination is made of whether a pixel of a bitmap window of the bitmap image file is a black or white pixel, whether this pixel is located in a single pixel width line, and the location of this pixel with respect to a kink site.

20. A method as claimed in claim 15 and including the step of rotating a bitmap window of the bitmap image file to a predetermined reference direction in response to gradient direction information corresponding thereto.

21. A method as claimed in claim 20 and wherein a determination is made of whether a central pixel of the bitmap window is a black or white pixel, whether the central pixel is located in a single pixel width line, and the location of the central pixel with respect to a kink site.

22. A method as claimed in claim 15 and wherein a determination is made of whether a pixel of a bitmap window of the bitmap image file is a black or white pixel, whether this pixel is located in a single pixel width line, and the location of this pixel with respect to a kink site.

23. A method as claimed in claim 15 and including the step of printing the enhanced data with a gray-scale printer.

24. A method as claimed in claim 15 and including the step of displaying the enhanced data on a gray-scale display.

25. An image processing system for processing image data representing an image, said system comprising: means for storing image data including binary image data; means for performing edge enhancement of the binary image data to produce gray-scale enhanced binary image data; wherein said means for performing edge enhancement includes means for determining gradient magnitudes corresponding to pixel locations of the image data; means for determining gradient directions corresponding to pixel locations of the image data; decision matrix means for comparing a window of the image data and the gradient magnitudes and directions corresponding thereto to predetermined sets of criteria and generating a look-up table address in response to the comparing; and a look-up table storing data for generating gray-scale enhanced binary image data in response to the look-up table address to reduce jaggedness in the image.

26. A system as claimed in claim 25, wherein the decision matrix means includes means for rotating the window to a predetermined reference direction in response to the gradient direction information corresponding thereto.

27. A system as claimed in claims 26, wherein the decision matrix means determines whether a central pixel of the window is a black or white pixel, whether the central pixel is located in a single pixel width line, and the location of the central pixel with respect to a kink site.

28. A system as claimed in claim 25, wherein the decision matrix means determines whether a central pixel of the window is a black or white pixel, whether the central pixel is located in a single pixel width line, and the location of the central pixel with respect to a kink site.

29. A system of claim 25 in combination with a gray-scale printer.

30. A system of claim 25 in combination with a gray-scale display.

* * * * *